(12) United States Patent
Imamura et al.

(10) Patent No.: US 8,072,497 B2
(45) Date of Patent: Dec. 6, 2011

(54) IMAGING APPARATUS AND RECORDING MEDIUM

(75) Inventors: Keiichi Imamura, Hamura (JP); Kazunori Yanagi, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 500 days.

(21) Appl. No.: 12/258,523

(22) Filed: Oct. 27, 2008

(65) Prior Publication Data

US 2009/0135261 A1    May 28, 2009

(30) Foreign Application Priority Data

Nov. 22, 2007 (JP) .................................. 2007-303507

(51) Int. Cl.
*H04N 5/228* (2006.01)
*H04N 5/225* (2006.01)
(52) U.S. Cl. ................. 348/208.16; 348/220.1
(58) Field of Classification Search ............... 348/220.1, 348/169, 154, 155, 208.99, 208.14, 208.16
See application file for complete search history.

(56) References Cited

U.S. PATENT DOCUMENTS

| | | | | |
|---|---|---|---|---|
| 5,103,254 A | * | 4/1992 | Bell et al. .................... | 396/147 |
| 2002/0149681 A1 | * | 10/2002 | Kahn et al. .................. | 348/211.99 |
| 2005/0231602 A1 | * | 10/2005 | Obrador et al. ............. | 348/208.14 |

FOREIGN PATENT DOCUMENTS

| | | |
|---|---|---|
| JP | 2001-235782 A | 8/2001 |
| JP | 2005-151542 A | 6/2005 |
| JP | 2006-067452 A | 3/2006 |
| JP | 2006-246354 A | 9/2006 |
| JP | 2006-317848 A | 11/2006 |

OTHER PUBLICATIONS

Japanese Office Action dated Sep. 16, 2009 and English translation thereof in counterpart Japanese Application No. 2007-303507.

* cited by examiner

*Primary Examiner* — Jason Chan
*Assistant Examiner* — Ahmed A Berhan
(74) *Attorney, Agent, or Firm* — Holtz, Holtz, Goodman & Chick, PC (57) ABSTRACT

When a digital camera 1 is being swung, the CPU 10 judges whether or not a block group having motion vectors which are varyingly different from the motion vectors of a peripheral area 32 in a field angle photographing area as shown in FIG. 3A exists in a center area 31 as shown in FIG. 3B. When judged that a block group having varyingly different motion vectors exists in the center area 31, the digital camera 1 determines this block group as an observed photographic subject area. Subsequently, when the scalar quantity of the largest motion vector, among the motion vectors of each block in the determined observed photographic subject area, is smaller than a threshold v, the digital camera 1 judges that the user is attempting to perform a follow shot and there is no blurring of the photographic subject, and performs automatic shooting.

10 Claims, 5 Drawing Sheets

IMAGING APPARATUS AND RECORDING MEDIUM

CROSS-REFERENCE TO RELATED APPLICATION

This application is based upon and claims the benefit of priority from the prior Japanese Patent Application No. 2007-303507, filed Nov. 22, 2007, the entire contents of which is incorporated herein by reference.

BACKGROUND OF THE INVENTION

1. Field of the Invention

The present invention relates to an imaging apparatus and a program thereof, and particularly relates to an imaging apparatus having automatic shooting functions and a program thereof.

2. Description of the Related Art

Conventionally, there have been devised cameras equipped with an automatic shooting function.

For example, Japanese Laid-Open (Kokai) Patent Publication 2001-235782 discloses an art that, when the detected angular velocity or angular acceleration of a camera satisfies a predetermined condition, automatically shoots an image after judging that a follow shot (i.e., a shooting technique in which a user shoots a moving photographic subject while moving the camera) is being attempted.

SUMMARY OF THE INVENTION

In accordance with one aspect of the present invention, there is provided an imaging apparatus comprising: an imaging element; a motion vector detecting section which detects, based on image data imaged by the imaging element, motion vectors of the image data; a determination section which determines an area having the motion vectors detected by the motion vector detecting section which are different from motion vectors of a certain area; a judging section which judges whether or not a motion vector quantity of the area determined by the determination section is smaller than a predetermined quantity; and an automatic shooting control section which controls the imaging element to automatically perform still image shooting when judged by the judging section that the motion vector quantity is smaller than the predetermined quantity.

In accordance with another aspect of the present invention, there is provided a computer-readable storage medium having a program stored thereon that is executable by a computer including an imaging element to cause the computer to perform a process comprising: first processing which detects, based on image data imaged by the imaging element, motion vectors of the image data; second processing which determines an area having the motion vectors detected by the first process which are different from motion vectors of a certain area; third processing which judges whether or not a motion vector quantity of the area determined by the second process is smaller than a predetermined quantity; and fourth processing which controls the imaging element to automatically perform still image shooting when judged by the third process that the motion vector quantity is smaller than the predetermined quantity.

The above and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments in which an imaging apparatus is applied to a digital camera as an example shown in the accompanying drawings.

Embodiments of the Invention

A. Configuration of the Digital Camera

Figure 1:
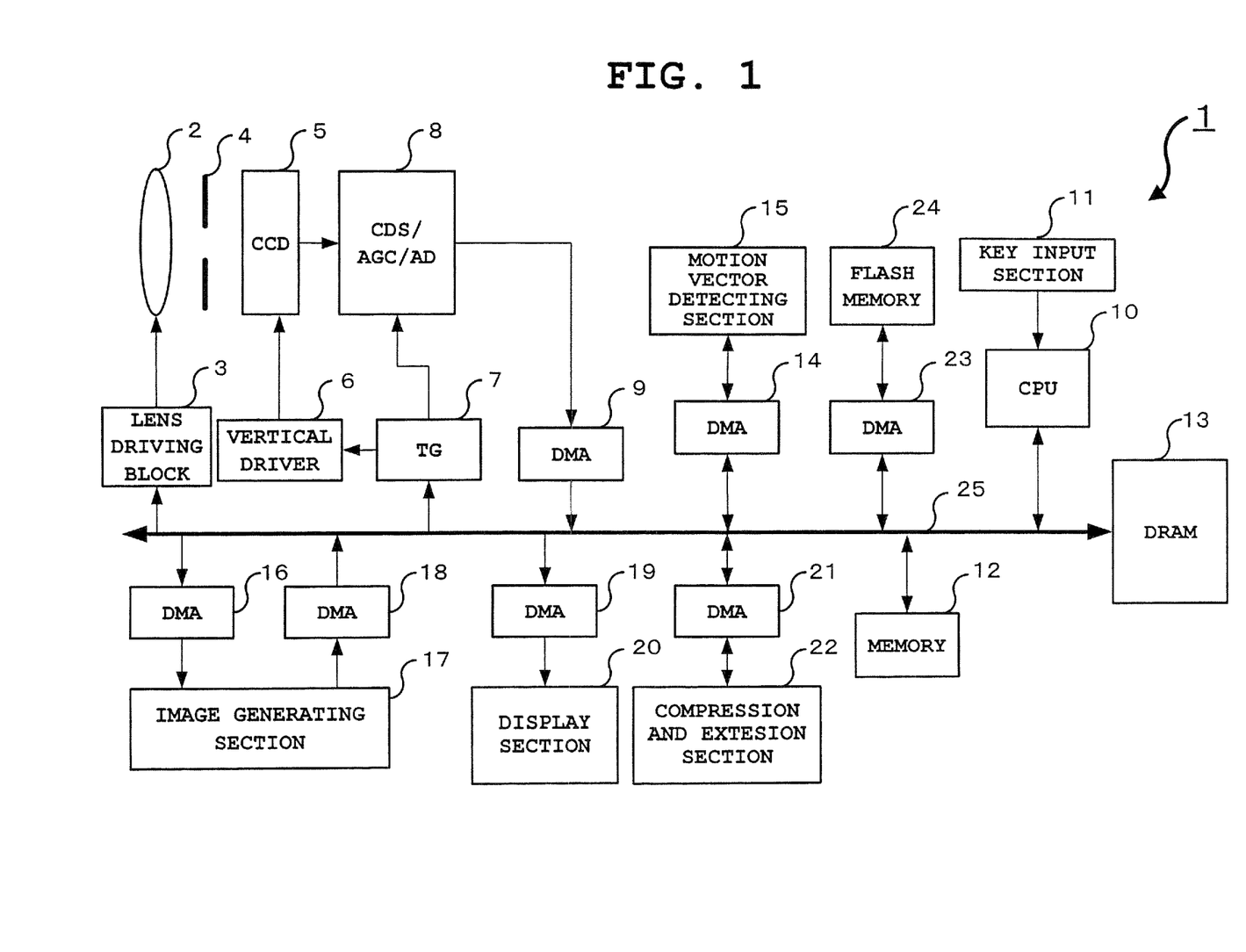
FIG. 1 is a block diagram of a digital camera according to an embodiment of the present invention.

FIG. 1 is a block diagram showing an electric schematic of a digital camera 1 according to the present embodiment.

The digital camera 1 includes an imaging lens 2, a lens driving block 3, a shutter-aperture 4, a charge-coupled device (CCD) 5, a vertical driver 6, a timing generator (TG) 7, a unit circuit 8, a direct memory access (DMA) controller (hereinafter "DMA") 9, a central processing unit (CPU) 10, a key input section 11, a memory 12, a dynamic random access memory (DRAM) 13, a DMA 14, a motion vector detecting section 15, a DMA 16, an image generating section 17, a DMA 18, a DMA 19, a display section 20, a DMA 21, a compression and extension section 22, a DMA 23, a flash memory 24, and a bus 25.

The imaging lens 2 includes a focus lens and a zoom lens each of which includes a plurality of lens groups not shown, and is connected with the lens driving block 3. The lens driving block 3 includes a focus motor, a zoom motor, a focus motor driver and a zoom motor driver (not shown). The focus motor and the zoom motor respectively drive the focus lens and the zoom lens in the optical axis direction. The focus motor driver and the zoom motor driver respectively drive the focus lens and the zoom lens in the optical axis direction in adherence to a control signal sent from the CPU 10.

The shutter-aperture 4 includes a driver circuit not shown, and the driver circuit activates the shutter-aperture 4 in adherence to a control signal sent from the CPU 10. This shutter-aperture functions as an aperture and a shutter.

The aperture refers to a mechanism that controls an amount of light irradiated from the imaging lens 2, and the shutter refers to a mechanism that controls a period of time during which light is irradiated to the CCD 5. The period of time during which light is irradiated to the CCD 5 varies depending on a speed at which the shutter is opened and closed (that is, a shutter speed). The exposure can be determined based on the aperture and the shutter speed.

The CCD 5 is driven for scanning by the vertical driver 6, and after photo-electrically converting the light intensity of the respective colors in the RGB value of a photographic subject image to an imaging signal at a constant cycle, outputs the imaging signal to the unit circuit 8. The operation timing of this vertical driver 6 and unit circuit 8 are controlled by the CPU 10 via the TG 7. Note that the CCD 5 has the color filters of Bayer array, and also has a function of an electronic shutter. The shutter speed of this electronic shutter is controlled by the CPU 10 via the vertical driver 6 and the TG 7.

The TG 7 is connected to the unit circuit 8. The unit circuit 8 includes a correlated double sampling (CDS) circuit, an automatic gain control (AGC) circuit, and an analog-to-digital (A/D) converter. The CDS circuit performs correlated double sampling on an imaging signal outputted from the CCD 5 and holds the sampled imaging signal. The AGC circuit performs automatic gain control on the sampled imaging signal. The A/D converter converts the automatic-gain-controlled analog imaging signal to a digital signal. The imaging signal outputted from the CCD 5 is stored in a state of Bayer data in the buffer memory (DRAM 13), via the unit circuit 8.

The CPU 10 is a one-chip microcomputer having a function that performs AE processing, AF processing, imaging processing and the like, and controls each section of the digital camera 1. In addition, the CPU 10 includes a clock circuit which clocks date and time.

Particularly, the CPU 10 has a function that judges whether or not the digital camera 1 is being swung based on a motion vector detected by the motion vector detecting section 15, a function that judges whether or not a follow shot is being attempted, a function that determines an area having motion vectors which are varyingly different from the motion vector of a peripheral area in a field angle photographing area which has been detected by the motion vector detecting section 15, a function that judges whether or not the scalar quantity of the motion vector of the area determined is smaller than a threshold v, and a function that automatically performs still image shooting when judged that the scalar quantity of the motion vector of the area determined is smaller than the threshold v.

The key input section 11 includes a plurality of operation keys such as a shutter button enabling both half-depression and full-depression operations, a mode selection key, a cross key, and a SET key, and outputs operational signals that correspond to the key operations performed by the user to the CPU 10.

The memory 12 stores a control program required for the CPU 10 to control each section of the digital camera 1 and necessary data (the threshold v, the threshold s, etc.), and the CPU 10 operates in accordance with this program.

The DRAM 13 is used as a buffer memory for temporarily storing image data imaged by the CCD 5, and also used as a working memory of the CPU 10.

The DMA 14 reads out Bayer data or luminosity color-difference signal image data to be described later which has been stored in the buffer memory, and outputs it to the motion vector detecting section 15.

The motion vector detecting section 15 detects motion vectors of a certain area in frame image data. The motion vectors in the image data is detected by the representative point matching method, the block matching method, or the like.

In the present embodiment, imaged frame image data (the present frame image data) is divided into a plurality of blocks (m pixels×n pixels each). Then, based on the image data of the respective divided blocks (respective areas) and on frame image data (the preceding frame image data) imaged before the present frame image data, the motion vectors of the respective divided blocks are detected. Accordingly, a memory circuit for holding imaged frames for a certain period of time is also included in the motion vector detecting section 15. The detected motion vectors are sent to the CPU 10 via the DMA 14.

The DMA 16 reads out image data in Bayer data format stored in the buffer memory (DRAM 13), and outputs it to the image generating section 17.

The image generating section 17 performs processing such as pixel interpolation processing, gamma correction processing, white balance processing and the like on image data sent from the DMA 16, and generates luminosity color-difference signals (YUV data). In short, it is a section that performs image processing.

The DMA 18 stores, in the buffer memory, luminosity color-difference signal image data (YUV data) on which image processing has been performed in the image generating section 17.

The DMA 19 outputs image data in YUV data format stored in the buffer memory to the display section 20.

The display section 20 includes a color liquid crystal display (LCD) and a driver circuit thereof, and displays the image of image data outputted from the DMA 19.

The DMA 21 outputs image data in YUV format or compressed image data stored in the buffer memory to the compression and extension section 22, and also stores image data compressed or extended by the compression and extension section 22 in the buffer memory.

The compression and extension section 22 is a section that performs compression and extension (for example, compression and extension in Joint Photographic Experts Group (JPEG) format or Moving Picture Experts Group (MPEG) format, etc.) of image data.

The DMA 23 reads out compressed image data stored in the buffer memory, and stores it in the flash memory 24. Also, the DMA 23 stores compressed image data recorded in the flash memory 24 in the buffer memory.

B. Detailed Explanation About Automatic Shooting.

As types of the automatic shooting in the present embodiment, there are blurring detection automatic shooting and follow shot detection automatic shooting. Hereinafter, each of these automatic shooting types will be explained.

B-1. Blurring Detection Automatic Shooting

In blurring detection automatic shooting, automatic shooting is performed when the image blurring quantity of the imaged image data is smaller than the threshold v.

Therefore, when the scalar quantity of the largest motion vector among the motion vectors of each block of image data detected by the motion vector detecting section 15 is smaller than the threshold v, the image blurring quantity of the image data is judged to be small or none and automatic shooting will be performed.

In other words, in blurring detection automatic shooting, when the scalar quantity of the motion vector of any block is equal to or more than the threshold v, automatic shooting will not be performed.

B-2. Follow Shot Detection Automatic Shooting

In the present embodiment, "follow shot" refers to a photographing style in which a user shoots a moving photographic subject while moving the camera.

In follow shot detection automatic shooting, after judged that the digital camera 1 is being swung and further judged that the user is attempting to perform a follow shot, when an observed photographic subject area which is the subject of the follow shot has been determined from the imaged image data and the blurring quantity of the image in this observed photographic subject area is smaller than the threshold v, the digital camera 1 performs automatic shooting.

Therefore, when the scalar quantity of the largest motion vector among the motion vectors of each block in an observed photographic subject area detected by the motion vector detecting section 15 is smaller than the threshold v, the image blurring quantity of the image data is judged to be small or none and automatic shooting will be performed.

Here, the specific difference between blurring detection automatic shooting and follow shot detection automatic shooting is the area of a motion vector, which serves as the basis for judging whether or not to perform automatic shooting. That is, each is different in that, in blurring detection automatic shooting, judgment is made based on whether or not the motion vector quantity of the entire area of image data has is smaller than the threshold v, and in follow shot detection automatic shooting, judgment is made based on whether or not the motion vector quantity of an observed photographic subject area has is smaller than the threshold v.

Next, a detailed explanation will be given regarding the judgment of whether or not a user is attempting to perform a follow shot and determination of an observed photographic subject area.

First, when a user attempts to perform a follow shot, normally the user (a photographer) moves the digital camera 1 along with the movement of an observed photographic subject so that the observed photographic subject is positioned at the center of the field angle photographing area. Thus, the background will be moving in a direction opposite to the direction in which the observed photographic subject will be moving, and the observed photographic subject should be located in the center of the field angle photographing area substantially in a fixed state.

Accordingly, the motion vectors of the background will be directed in one direction, and the motion vectors of the observed photographic subject will be varyingly different from the motion vectors of the background. Note that in the case when the user accurately captures the observed photographic subject at the center of the field angle photographing area, the motion vectors of the observed photographic subject will be substantially 0.

Figure 2:
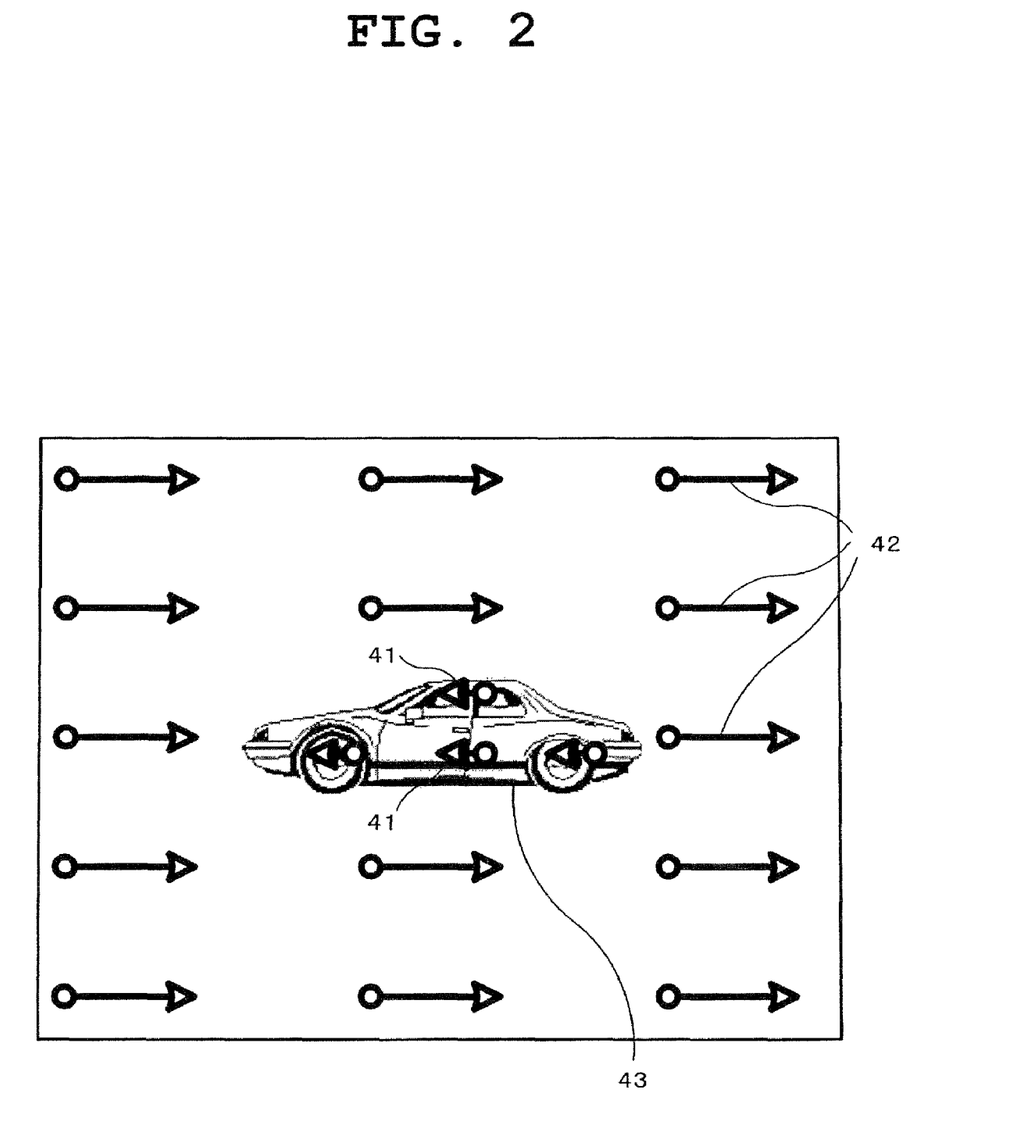
FIG. 2 is a diagram showing an example state of motion vectors detected when a user is attempting to perform a follow shot by moving the digital camera 1 leftward during a through image display.

FIG. 2 is a diagram showing an example state of motion vectors detected when the user is attempting to perform the follow shot of a car traveling leftward by moving the digital camera 1 leftward during a through image display. As can be seen from FIG. 2, the motion vectors 42 of the background are directed in one direction, and the motion vectors 41 of the car 43 which is the observed photographic subject are varyingly different compared with the motion vectors 42 of the background.

This principle is applied for judging whether or not the user is attempting to perform a follow shot and determining an observed photographic subject area.

Figure 3A:
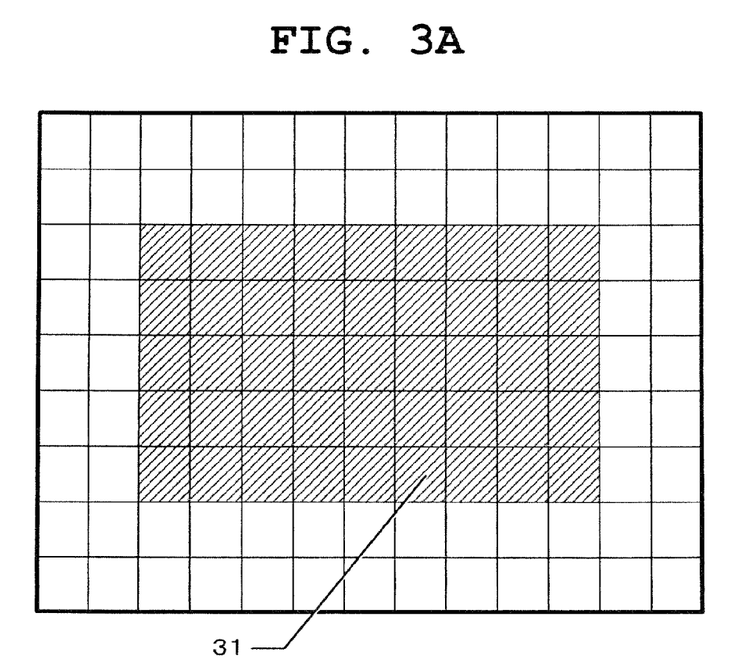
FIG. 3A is a diagram showing an example state of the center area 31 of a field angle photographing area.
Figure 3B:
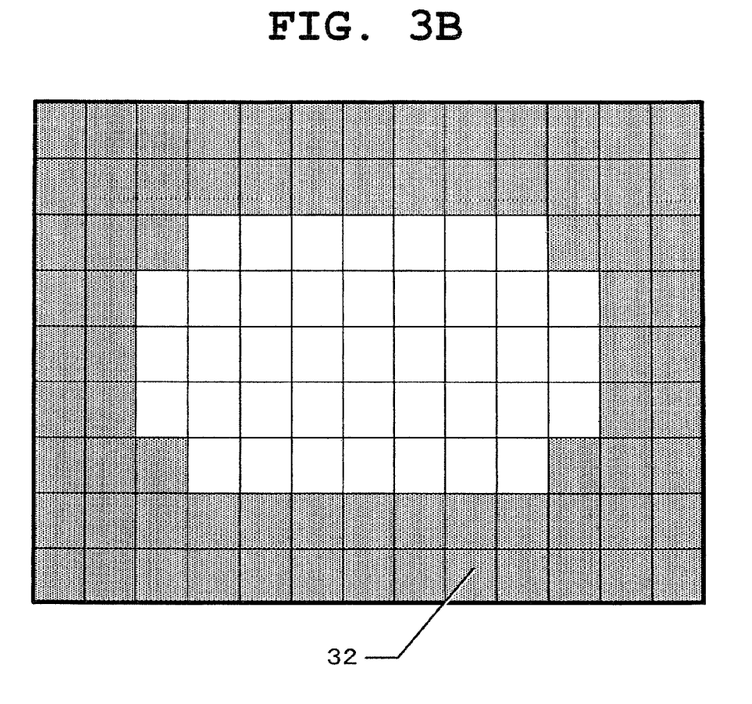
FIG. 3B is a diagram showing an example state of the peripheral area 32 in the field angle photographing area.

FIG. 3 is a diagram showing an example state of a center area and a peripheral area in a field angle.

FIG. 3A shows an example state of the center area 31 of the field angle photographing area. As can be seen from FIG. 3A, frame image data is divided into a plurality of blocks, and the center area 31 consists of a plurality of blocks (the blocks with slash lines) positioned in the center of the field angle photographing area.

In addition, FIG. 3B shows an example state of the peripheral area in the field angle photographing area. As can be seen from FIG. 3B, the peripheral area 32 consists of blocks (the shaded blocks) predominantly positioned at the outer sides of the field angle photographing area. Note that the peripheral area 32 needs not be consist of all blocks at the outer sides of the field angle photographing area as shown in FIG. 3B, it may just consist of some blocks at the outer sides of the field angle photographing area.

As can be seen from FIG. 3, there is an overlapping area of the center area 31 and the peripheral area 32 in this field angle photographing area. However, the center area 31 and the peripheral area 32 may be set in such a manner that there is no overlapping area of these two areas, or that the peripheral area 32 be any area other than the center area 31.

First, before judging whether or not the user is attempting to perform a follow shot, the digital camera 1 judges whether or not the camera is being swung, namely, whether or not panning is being performed. This is because, if the digital camera 1 is not being swung, it implies that the user is not attempting to perform a follow shot.

In the judgment on whether or not the camera is being swung, when the scalar quantity of the motion vector of the peripheral area 32 in the field angle photographing area is equal to or more than the threshold s, the digital camera 1 is judged as being swung.

Here, the purpose for judging whether or not the scalar quantity of the motion vector of the peripheral area 32 in the field angle photographing area is equal to or more than the threshold s is to distinguish between blurring and swing of a follow shot. When the scalar quantity of the motion vector is smaller than the threshold s, it can be regarded as simple blurring.

Also, the motion vector of the peripheral area 32 in the field angle photographing area refers to that within the motion vectors 42 of each block in the peripheral area 32, a motion vector with the largest number of identical motion vectors, or a motion vector of which the number of identical motion vectors is more than a predetermined number. Note that, when the digital camera 1 is being swung, the detection of the motion vectors 42 of the blocks in the peripheral area 32 (background area) is easy to be unsuccessful, and thus all the motion vectors 42 in the blocks of the peripheral area 32 are not always detected. For example, when an image of the blocks in the peripheral area 32 in the present frame image data does not exist in the preceding frame image data, the detection of the motion vectors 42 of these blocks will be unsuccessful.

In cases where judged that the digital camera 1 is being swung, when there is a block group (cluster of blocks) of motion vectors which are varyingly different motion vectors within each block of the center area 31 from the motion vectors in the peripheral area 31, the digital camera 1 judges that the user is attempting to perform a follow shot. This varyingly different block group serves as the observed photographic subject area. Accordingly, if there is no block group having varyingly different motion vectors, it is a situation where the user has merely panned the camera.

In the present embodiment, the varyingly different motion vectors refers to motion vectors of which the quantity is smaller than the quantity of the motion vectors of the peripheral area 32 (background area) by equal to or more than a predetermined ratio (for example, ratio of 2 to 1). Note that the varyingly different motion vectors may be motion vectors of which the quantity is smaller than a predetermined quantity, or may be motion vectors of which the quantity is simply smaller than the quantity of the motion vector of the peripheral area 32. In addition, the varyingly different motion vectors may be motion vectors of which the direction is different from the direction of the motion vector of the peripheral area 32, or may be motion vectors of which the quantity and the direction are different from the quantity and the direction of the motion vector of the peripheral area 32.

Also, the purpose for using the term "a block group" here is to prevent the fault of being judged that the user is attempting to perform a follow shot when the number of blocks having motion vectors which are varyingly different from the motion vector of the peripheral area 32 is not equal to or more than a predetermined number, for example, only one. That is, if the number of varyingly different motion vectors is not equal to or more than a predetermined number, it can be considered as the erroneous detection of motion vector.

When judged that the user is attempting to perform a follow shot, a block group (a group of blocks) in the center area 31 having motion vectors which are varyingly different from the motion vector of the peripheral area 32 is determined as an observed photographic subject area.

Here, in the digital camera 1 of this embodiment based on the motion vectors of the peripheral area 32, when there is an area (a block group) having motion vectors which are varyingly different from the motion vectors of the peripheral area 32 within the center area 31, this is judged as attempting to perform a follow shot and the area having these varyingly different motion vectors will be determined as an observed photographic subject area. The reason for the above is that, usually in a follow shot the user moves the digital camera 1 so that the observed photographic subject is positioned at the center of the field angle photographing area, and thus the peripheral area 32 in the field angle photographing area can be considered to be a background (a photographic subject other than the observed photographic subject). Accordingly, an area in the center area 31 having the same motion vectors as the motion vectors of the peripheral area 32 in the field angle photographing area can be considered to be a background, and only an area having motion vectors which are varyingly different from the motion vector of the peripheral area 32 in the field angle photographing area are considered as an observed photographic subject area. In this manner, the user is considered to be attempting to perform a follow shot.

Subsequently, when the largest motion vector in the blocks in the determined observed photographic subject area is smaller than the threshold v, the digital camera 1 performs automatic shooting. In other words, in follow shot detection automatic shooting, when the scalar quantity of the motion vector of any block in an observed photographic subject area is equal to or more than the threshold v, the digital camera 1 will not perform automatic shooting.

C. Operations of the Digital Camera 1

The operation of the digital camera 1 according to the embodiment will hereinafter be described with reference to flowcharts of FIGS. 4 and 5.

When the automatic shooting mode is set by the user's operation of the mode selection key in the key input section 11, the CPU 10 displays a list of the types of automatic shooting (Step S1). Here, as types of automatic shooting, there is a list display of blurring detection automatic shooting and follow shot detection automatic shooting. At this time, these are displayed with a cursor aligned to either type of automatic shooting.

Next, the CPU 10 judges whether or not the type of automatic shooting has been selected by the user (Step S2). This judgment is made based on whether or not an operational signal corresponding to the operation of the SET key has been sent from the key input section 11.

Here, by the operation of the cross key, the user can place the cursor on either blurring detection automatic shooting or follow shot detection automatic shooting on the list displayed if the type of automatic shooting at the cursor is acceptable, the user selects the type of automatic shooting currently at the cursor by the operation of the SET key.

When judged that the type of automatic shooting has been selected at Step S2, the CPU 10 sets the selected type of automatic shooting (Step S3). Accordingly, the set type of automatic shooting will be performed.

After the setting of the automatic shooting, the CPU 10 controls the CCD 5 to start imaging a subject at a predetermined frame rate, and starts a so-called through image display (Step S4). In the through image display, the display section 20 displays the frame image data of luminosity color difference signals which have been sequentially generated by the image generating section 17 and stored in the buffer memory (DRAM 13).

Next, the CPU 10 judges whether or not the half-depression of the shutter button has been performed by the user (Step S5). This judgment is made based on whether or not an operational signal corresponding to the half-depression of the shutter button has been sent from the key input section 11.

When judged at Step S5 that the half-depression of the shutter button has not been performed, the CPU remains at Step S5 until the half-depression is performed. When judged that the half-depression has been performed, the CPU 10 controls the motion vector detecting section 15 to sequentially output frame image data imaged and stored in the buffer memory, and to start processing for detecting the motion vector of each block in each frame image data imaged (Step S6).

Next, the CPU 10 acquires the motion vector of each block in the most recent frame image data detected by the motion vector detecting section 15 (Step S7).

Then, the CPU 10 judges whether or not follow shot detection automatic shooting has been set as the type of automatic shooting (Step S8).

When judged at Step S8 that follow shot detection automatic shooting has not been set, that is, when judged that the blurring detection automatic shooting has been set, the CPU 10 selects the greatest motion vector (the largest motion vector) from among the motion vectors of each block in the frame image data acquired at Step S7 (Step S9), and proceeds to Step S15.

At Step S15, the CPU 10 compares the scalar quantity of the selected largest motion vector with the threshold v, and judges whether or not the scalar quantity of the largest motion vector is smaller than the threshold v (Step S16).

At Step S16, when judged that the scalar quantity of the largest motion vector is not smaller than the threshold v, the CPU 10 returns to Step S7, and after acquiring the motion vector of each block in the most recent frame image data, repeats the operations described above.

Note that the motion vector detecting section 15 detects the motion vector of each block in the frame image data most recently imaged, before the reading out of the next frame image data from the CCD 5 is completed. In addition, a series of processing in Step S7 to Step S9, Step S15, and Step S16 should also be performed before the reading out of the next frame image data from the CCD 5 is completed. In other words, the CPU 10 judges whether or not to automatically shoot an image for each frame image data. Thereby, the first timing for automatic shooting will not be missed.

On the other hand, when judged at Step S16 that the scalar quantity of the largest motion vector is smaller than the threshold v, the CPU 10 performs the automatic shooting recording processing (Step S17). That is, even when a photographing instruction operation has not been performed by the user, still image shooting processing (follow shot) is performed automatically, and still image data compressed in the compression and extension section 22 is recorded in the flash memory 24 via the DMA 23. This still image shooting processing is performed with a shutter speed at least slower than the shutter speed of imaging during the detection of motion vectors (the time between the half-depression of the shutter button and automatic shooting). This is because, if an imaging is performed with slow shutter speed also during the detection of motion vectors, the image blurring of the obtained image would be large and the motion vectors would not be detected with high accuracy.

Figure 4:
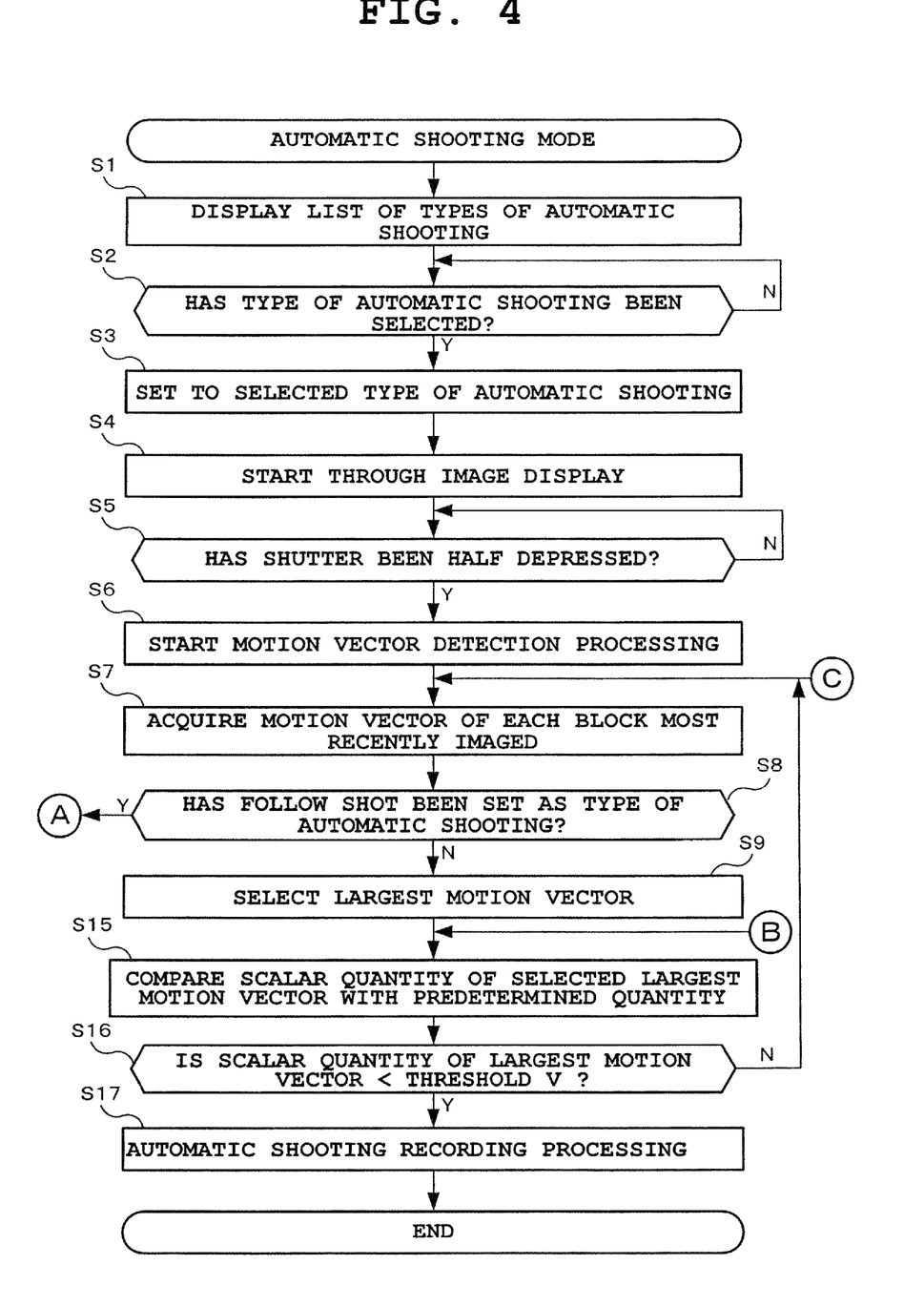
FIG. 4 is a flow chart showing an operation of the digital camera 1 according to the embodiment.
Figure 5:
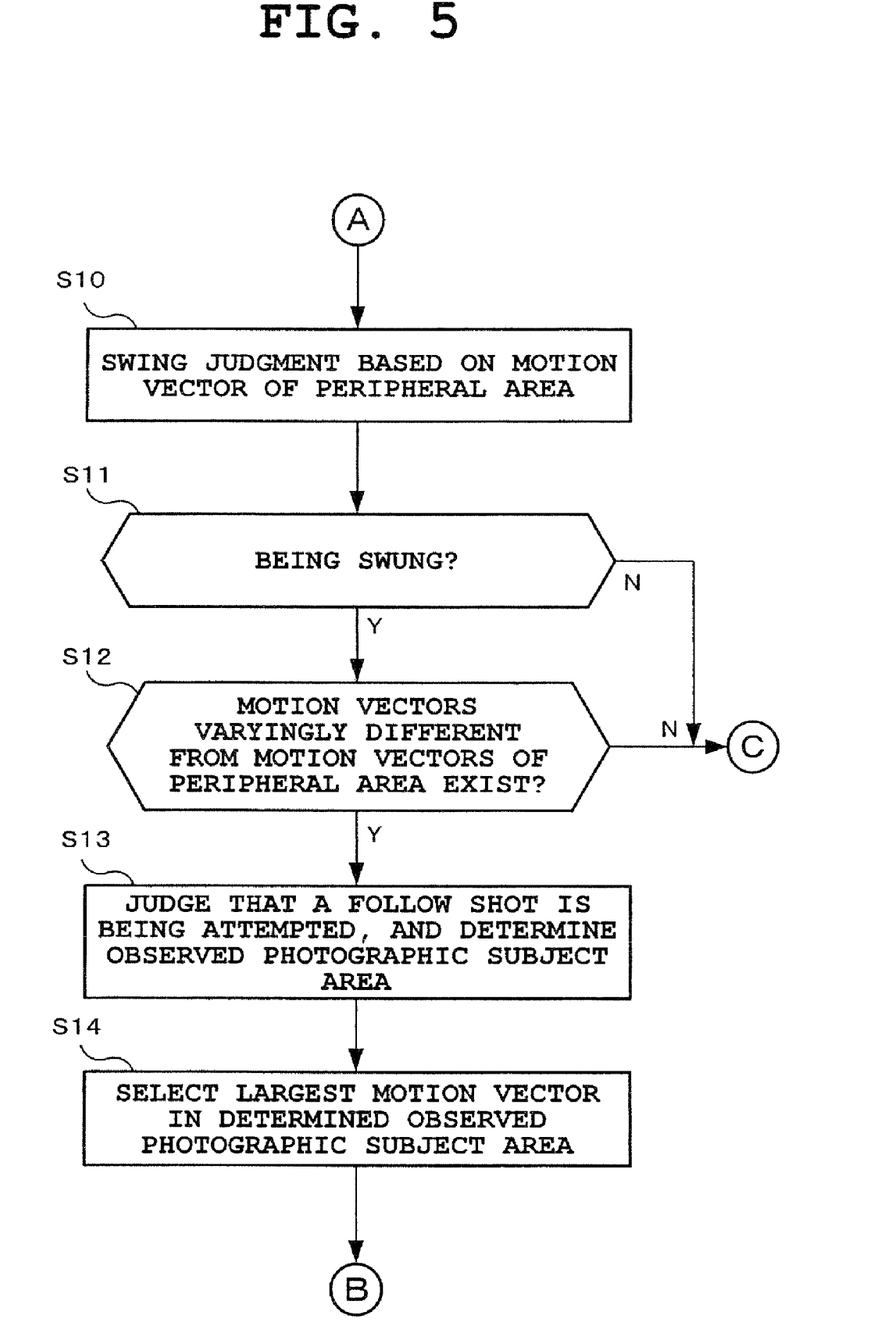
FIG. 5 is a flow chart showing an operation of the digital camera 1 according to the embodiment.

When judged at Step S8 that follow shot detection automatic shooting has been set as the type of automatic shooting, the CPU 10 proceeds to Step S10 in FIG. 5. At Step S10, the CPU 10 judges whether or not the digital camera 1 is being swung based on the motion vector of the peripheral area 32 in the frame image data acquired at Step S7 in FIG. 4.

This judgment on whether or not the digital camera 1 is being swung is made based on whether or not the motion vector quantity of the peripheral area 32 in the field angle photographing area is equal to or more than the thresholds. Also, the motion vector of the peripheral area 32 in the field angle photographing area refers to, among the motion vectors 42 of each block in the peripheral area 32, a motion vector with the largest number of identical motion vectors, or a motion vector of which the number of identical motion vectors is more than a predetermined number.

Next, the CPU 10 judges whether or not the digital camera 1 has been judged as being swung (Step S11).

When judged at Step S11 that the digital camera 1 has been judged as being swung, the CPU 10 judges whether or not a group of motion vectors which are varyingly different from the motion vector of the peripheral area 32 in the field angle photographing area exists in the center area 31 of the field angle photographing area (Step S12).

That is, the CPU 10 judges whether or not a block group having motion vectors which are different from a motion vector with the largest number of identical motion vectors among the motion vectors of each block in the peripheral area 32 in the field angle photographing area exists in the center area 31, or the CPU 10 judges whether or not a block group having motion vectors which are varyingly different from a motion vector of which the number of identical motion vectors is more than a predetermined number exists in the center area 31.

When judged at Step S11 that the digital camera 1 has not been judged as being swung, and further judged at Step S12 that there is no group having motion vectors which are varyingly different from the motion vector of the peripheral area 32 in the field angle photographing area exists in the center area 31 of the field angle photographing area, the CPU returns to Step S7 in FIG. 4, and after acquiring the motion vectors of the each block in the most recent frame image data, repeats the above described operations. This is because, when there is no block group having varyingly different motion vectors in the center area 31, the user can be considered as not attempting to perform a follow shot, that is, the user can be considered to have performed mere panning of the digital camera 1.

On the contrary, when judged at Step S12 that a group of motion vectors having motion vectors which are varyingly different from the motion vector of the peripheral area 32 in the field angle photographing area exists in the center area 31 of the field angle photographing area, the CPU 10 judges that the user is attempting to perform a follow shot, and determines an observed photographic subject area which is the subject of a follow shot (Step S13). That is, the CPU determines a block group in the center area 31 having motion vectors which are varyingly different from the motion vectors of the peripheral area 32.

Subsequently, the CPU 10 selects the greatest motion vector (the largest motion vector) from among the motion vectors of the blocks in this determined observed photographic subject area (Step S14), and proceeds to Step S15 in FIG. 4.

At Step S15, as described above, the CPU 10 compares the scalar quantity of the selected largest motion vector with the threshold v, and judges whether or not the scalar quantity of the largest motion vector is smaller than the threshold v (Step S16).

When judged at Step S16 that the scalar quantity of the largest motion vector is not smaller than the threshold v, the CPU 10 returns to Step S7, and after acquiring the motion vectors of each block in the most recent frame image data, repeats the above described operations. On the contrary, when judged at Step S16 that the scalar quantity of the largest motion vector is smaller than the threshold v, the CPU 10 judges that the user is attempting to perform a follow shot and that there is no blurring of the photographic subject, and performs the automatic shooting recording processing (follow shot) (Step S17).

Note that a series of processing at Step S7 and Step S8 in FIG. 4, Step S10 to Step S14 in FIG. 5, and Step S15 and Step S16 in FIG. 4 should be performed before the reading out of the next frame image data from the CCD 5 is completed. In other words, the CPU 10 judges whether or not to automatically shoot an image for each frame image data. Thereby, the first timing for automatic shooting will not be missed.

As mentioned above, in the embodiment, a block group in the center area 31 having motion vectors which are varyingly different from the motion vector of the peripheral area 32 is determined as an observed photographic subject area, and when the largest motion vector in the observed photographic subject area is smaller than the threshold v, still image shooting is performed automatically without waiting for a photographing instruction by the user. Accordingly, a follow shot with no or little blurring of observed photographic subject can be performed automatically.

Also, the CPU 10 judges whether or not the camera is being swung based on whether or not the scalar quantity of the motion vector of the peripheral area 32 in a field angle photographing area is equal to or more than the threshold s. Accordingly, whether the camera is being swung or is shaking can be distinguished with high accuracy.

Furthermore, since the camera is in the process of being swung, when a block group having motion vectors which are varyingly different from the motion vector of the peripheral area 32 exists in the center area 31, the CPU 10 judges that a follow shot is being attempted. Accordingly, whether it is in a state where the user is attempting to perform a follow shot or in a state where the user is performing mere panning of the digital camera 1 can be distinguished with high accuracy.

[Modifications]

The following variation example of the embodiment as described above is possible.

(01) According to the above-described embodiment, the peripheral area 32 in the field angle photographing area is considered as the background area, and based on the motion vector of the peripheral area 32, the CPU 10 judges whether or not the digital camera 1 is being swung. Also, based on whether or not there are motion vectors which are varyingly different from the motion vector of the peripheral area 32, the CPU 10 judges whether or not the user is attempting to perform a follow shot. However, an area randomly determined by the user may be set as the background area, and based on this area, a judgment such as whether or not the digital camera is being swung may be performed.

Also, instead of determining the area, a block having a motion vector with the largest number of identical motion vectors and blocks having the same motion vector may be set as the background area, among the motion vectors of each block. In this case, an observed photographic subject area (a block group having varyingly different motion vectors) may be determined from among areas other than the background area or all areas in the field angle photographing area, instead of the center area 31.

This also enables a follow shot with no or little blurring of observed photographic subject to be performed automatically.

(02) Moreover, according to the above-described embodiment, an observed photographic subject area (a block group having varyingly different motion vectors) is determined from the center area 31. However, an observed photographic subject area may be determined from among all areas in the field angle photographing area or from an area randomly determined by the user.

(03) Furthermore, according to the above-described embodiment, when the scalar quantity of the motion vector of the peripheral area 32 is equal to or more than the threshold s, the digital camera 1 is judged as being swung. However, the digital camera 1 may be judged as being swung, only when the scalar quantity of the motion vector of the peripheral area 32 is equal to or more than the threshold s and there is a similarity between the direction of the motion vector of this peripheral area 32 and the direction of the formerly detected motion vector of the peripheral area 32 (i.e. when the directions of the motion vectors are similar to some extent).

This is because, when the user is attempting to perform a follow shot, the digital camera 1 moves in the same direction, while when the digital camera 1 is shaking, the direction of the motion vectors is more likely to change and even reverses in some cases.

Thereby, a camera shake and a swing for a follow shot can be distinguished with high accuracy.

Furthermore, when the scalar quantity of the motion vector of the peripheral area 32 is equal to or more than the threshold s, the digital camera 1 is judged as being swung. However, alternatively, the digital camera 1 may be judged as being swung, only when there is a similarity between the direction of the motion vector of the peripheral area 32 and the direction of the formerly detected motion vector of the peripheral area 32 (i.e. when the directions of the motion vectors are similar to some extent). Thereby, a camera shake and a swing for a follow shot can be distinguished.

(04) Furthermore, according to the above-described embodiment, the CPU 10 judges whether or not the digital camera 1 is being swung at Step S10 in FIG. 5. However, without judging whether or not the digital camera 1 is being swung, the CPU 10 may judge whether or not a group having motion vectors which are varyingly different from the motion vector of the peripheral area 32 in the field angle photographing area exists in the center area 31. In this case, when judged at Step S8 in FIG. 4 that follow shot detection automatic shooting has been set, the CPU 10 proceeds to Step S12 in FIG. 5.

(05) Furthermore, according to the above-described embodiment, the CPU 10 judges whether or not the digital camera 1 is being swung based on the motion vector of the peripheral area 32. However, the embodiment may include an acceleration sensor, an angular acceleration sensor, or an angular velocity sensor, and the CPU 10 may judge whether or not the digital camera 1 is being swung when the quantity of motion detected by the acceleration sensor, the angular acceleration sensor, or the angular velocity sensor is equal to or more than a predetermined threshold. Additionally, the CPU 10 may judge whether or not the digital camera 1 is being swung when the quantity of the motion detected by the acceleration sensor, the angular acceleration sensor, or the angular velocity sensor is equal to or more than a predetermined threshold and there is a similarity between the direction of the detected motion and the direction of the formerly detected motion. Alternatively, the CPU 10 may judge whether or not the digital camera 1 is being swung when there is a similarity between the direction of the motion detected by the acceleration sensor, the angular acceleration sensor, or the angular velocity sensor and the direction of the formerly detected motion. Thereby, a camera shake and a swing for a follow shot can be distinguished.

(06) Furthermore, according to the above-described embodiment, the largest motion vector is selected at Step S9 in FIG. 4, and after the scalar quantity of the selected largest motion vector and the threshold v are compared (Step S15), when the scalar quantity of the largest motion vector is smaller than the threshold v, the automatic shooting recording is performed (Step S16, Step S17). However, the automatic shooting recording may be performed, after the mean quantity of the scalar quantities of the motion vectors of each block or the scalar quantity of the mean motion vector of the motion vectors of each block is compared with the threshold v, when the quantity is smaller than the threshold v. It is only required that whether or not the blurring quantity of all the areas of image data is smaller than the threshold v is judged.

Similarly, according to the above-described embodiment, the largest motion vector in the determined observed photographic subject area is selected at Step S14 in FIG. 5, and after the scalar quantity of the selected largest motion vector and the threshold v are compared (Step S15), when the scalar quantity of the largest motion vector is smaller than the threshold v, the automatic shooting recording is performed (Step S16, Step S17). However, the automatic shooting recording may be performed, after the mean quantity of the scalar quantities of the motion vectors of each block in the observed photographic subject area or the scalar quantity of the mean motion vector of the motion vectors of each block in the observed photographic subject area is compared with the threshold v, when the quantity is smaller than the threshold v. It is only required that whether or not the blurring quantity of an observed photographic subject area is smaller than the threshold v is judged.

(07) Furthermore, according to the above-described embodiment, the CPU 10 judges whether or not to perform automatic shooting for every frame image data. However, the CPU 10 may judge whether or not to perform automatic shooting for every predetermined frame. It is only required that whether or not to perform automatic shooting is judged in a predetermined cycle.

(08) Furthermore, the above-described embodiment and the above-described modifications (01) to (07) may be randomly combined as the modification.

(09) The individual embodiments of the present invention as described above are merely examples as a best mode for carrying out the invention, and aims to facilitate understanding of the principle and the structure of the present invention. It is not intended to limit the scope of the present invention. Therefore, it should be construed that various variations and modifications for the above-described embodiments of the present invention be included in the scope of the present invention.

Lastly, in the individual embodiments as described above, a case where an imaging apparatus of the present invention is applied to the digital camera 1 is described. However, the present invention is not limited to the above-described embodiments. In other words, the present invention may be applied to any apparatus as long as it can shoot a photographic subject.

Furthermore, although the processing program of the imaging apparatus which is a preferred embodiment of the present invention is stored in the memory (for example, ROM, etc.) of the imaging apparatus, this processing program is stored thereon a computer-readable medium and should also be protected in the case of manufacturing, selling, etc. of only the program. In that case, the method of protecting the program with a patent will be realized by the form of the computer-readable medium on which the processing program is stored.

While the present invention has been described with reference to the preferred embodiments, it is intended that the invention be not limited by any of the details of the description therein but includes all the embodiments which fall within the scope of the appended claims.

What is claimed is:

1. An imaging apparatus, comprising:
    an imaging element;
    a dividing section which divides image data captured by the imaging element into a plurality of blocks;
    a motion vector detection section which detects motion vectors of the blocks, respectively;
    a determination section which determines an area having a plurality of blocks with motion vectors that are different in quantity or direction from motion vectors of a certain area;
    a judging section which judges whether or not a quantity of the motion vectors of the blocks in the determined area is smaller than a first predetermined quantity;
    an automatic shooting control section which controls the imaging element to automatically perform still image shooting when the judging section judges that the quantity of the motion vectors of the blocks in the determined area is smaller than the first predetermined quantity; and
    a judgment section which judges whether or not the imaging apparatus including the imaging element is performing a follow shot, based on (i) whether or not a quantity of the motion vectors of blocks in the certain area is equal to or more than a second predetermined quantity and (ii) whether or not the determination section can determine the area having the plurality of blocks with motion vectors that are different in quantity or direction from motion vectors of the certain area.

2. The imaging apparatus according to claim 1, wherein the certain area is a peripheral area in a field angle photographing area.

3. The imaging apparatus according to claim 1, wherein the certain area is an arbitrarily determined area in a field angle photographing area.

4. The imaging apparatus according to claim 1, wherein the determination section determines the area from a center portion in a field angle photographing area.

5. The imaging apparatus according to claim 1, wherein the determination section determines the area from an arbitrarily determined portion in a field angle photographing area.

6. The imaging apparatus according to claim 1, wherein the determination section determines the area by determining an area having a plurality of blocks with motion vectors whose quantity is smaller than the quantity of the motion vectors of the blocks in the certain area.

7. The imaging apparatus according to claim 1, wherein the determination section determines the area by determining an area having a plurality of blocks with motion vectors whose quantity is smaller than the quantity of the motion vectors of the blocks in the certain area by equal to or more than a predetermined ratio, or is smaller than a predetermined quantity.

8. The imaging apparatus according to claim 1, wherein the motion vector detection section detects respective motion vectors of blocks of image data that is periodically captured by the imaging element.

9. The imaging apparatus according to claim 1, further comprising:
    an imaging control section which, until the judging section judges that the quantity of the motion vectors of the blocks in the determined area is smaller than the first predetermined quantity, controls a shutter speed for image data to be captured by the imaging element to be a shutter speed that is faster than a shutter speed for shooting by the automatic shooting control section.

10. A non-transitory computer-readable recording medium having a program stored thereon that is executable by a computer including an imaging element to control the computer to function as elements including:
    a dividing section which divides image data captured by the imaging element into a plurality of blocks;
    a motion vector detection section which detects motion vectors of the data blocks, respectively;
    a determination section which determines an area having a plurality of blocks with motion vectors that are different in quantity or direction from motion vectors of a certain area;
    a judging section which judges whether or not a quantity of the motion vectors of the blocks in the determined area is smaller than a first predetermined quantity;
    an automatic shooting control section which controls the imaging element to automatically perform still image shooting when the judging section judges that the quantity of the motion vectors of the blocks in the determined area is smaller than the first predetermined quantity; and
    a judgment section which judges whether or not the computer including the imaging element is performing a follow shot, based on (i) whether or not a quantity of the motion vectors of blocks in the certain area is equal to or more than a second predetermined quantity and (ii) whether or not the determination section can determine the area having the plurality of blocks with motion vectors that are different in quantity or direction from motion vectors of the certain area.

* * * * *